(12) United States Patent
Knabe

(10) Patent No.: US 8,861,671 B2
(45) Date of Patent: Oct. 14, 2014

(54) MODULE FOR FORMING A NUCLEAR FUEL ASSEMBLY AND CORRESPONDING NUCLEAR FUEL ASSEMBLY

(75) Inventor: Pawel Knabe, Mainhausen (DE)

(73) Assignee: Areva NP, Courbevoie (FR)

( * ) Notice: Subject to any disclaimer, the term of this patent is extended or adjusted under 35 U.S.C. 154(b) by 969 days.

(21) Appl. No.: 12/895,221

(22) Filed: Sep. 30, 2010

(65) Prior Publication Data

US 2011/0075789 A1    Mar. 31, 2011

(30) Foreign Application Priority Data

Sep. 30, 2009   (EP) ..................... 09305921

(51) Int. Cl.
*G21C 3/32*        (2006.01)
*G21C 3/334*       (2006.01)

(52) U.S. Cl.
CPC . *G21C 3/32* (2013.01); *Y02E 30/40* (2013.01); *G21C 3/334* (2013.01)
USPC ........................................................ 376/434

(58) Field of Classification Search
USPC .......................... 376/462, 448, 438
See application file for complete search history.

(56) References Cited

U.S. PATENT DOCUMENTS

| | | | |
|---|---|---|---|
| 3,567,582 A | | 3/1971 | Van Dievoet |
| 4,067,772 A | * | 1/1978 | Kim ............................... 376/254 |
| 4,268,356 A | * | 5/1981 | Kmonk et al. ................. 376/462 |
| 4,454,093 A | | 6/1984 | Nylund et al. |
| 4,585,614 A | * | 4/1986 | Helmersson ................... 376/434 |
| 4,666,664 A | * | 5/1987 | Doshi ............................ 376/261 |
| 4,695,426 A | * | 9/1987 | Nylund .......................... 376/441 |
| 4,707,328 A | * | 11/1987 | Arbink et al. ................. 376/446 |
| 4,716,015 A | | 12/1987 | Carlson |
| 4,795,608 A | * | 1/1989 | Nylund ......................... 376/444 |
| 5,259,009 A | * | 11/1993 | Patterson et al. ............. 376/439 |
| 5,519,746 A | | 5/1996 | Dalke et al. |
| 5,778,035 A | * | 7/1998 | Nylund ......................... 376/361 |
| 6,205,196 B1 | * | 3/2001 | Yamashita et al. ............ 376/438 |
| 6,510,192 B1 | * | 1/2003 | Yamashita et al. ............ 376/260 |
| 7,822,166 B2 | * | 10/2010 | Bucheit et al. ................ 376/438 |

FOREIGN PATENT DOCUMENTS

| | | |
|---|---|---|
| GB | 931 676 | 7/1963 |
| GB | 2054247 | 2/1981 |
| JP | 60 039589 | 3/1985 |
| JP | 62 187282 | 8/1987 |
| WO | WO 96/10828 | 4/1996 |

OTHER PUBLICATIONS

European Search Report for EP 09 30 5921.

* cited by examiner

*Primary Examiner* — Jack W Keith
*Assistant Examiner* — Marshall O'Connor
(74) *Attorney, Agent, or Firm* — Davidson, Davidson & Kappel, LLC

(57) ABSTRACT

A module including a casing extending in a longitudinal direction, a bundle of fuel rods encased in and supported by the casing and connector provided on the casing for connecting the casing side-by-side to the casing of at least one other module to obtain a nuclear fuel assembly having a channel box defined by the casings of the assembled modules and of larger cross-section than the casing of each of the assembled modules and a bundle of fuel rods of larger cross-section than that of each the assembled modules.

15 Claims, 11 Drawing Sheets

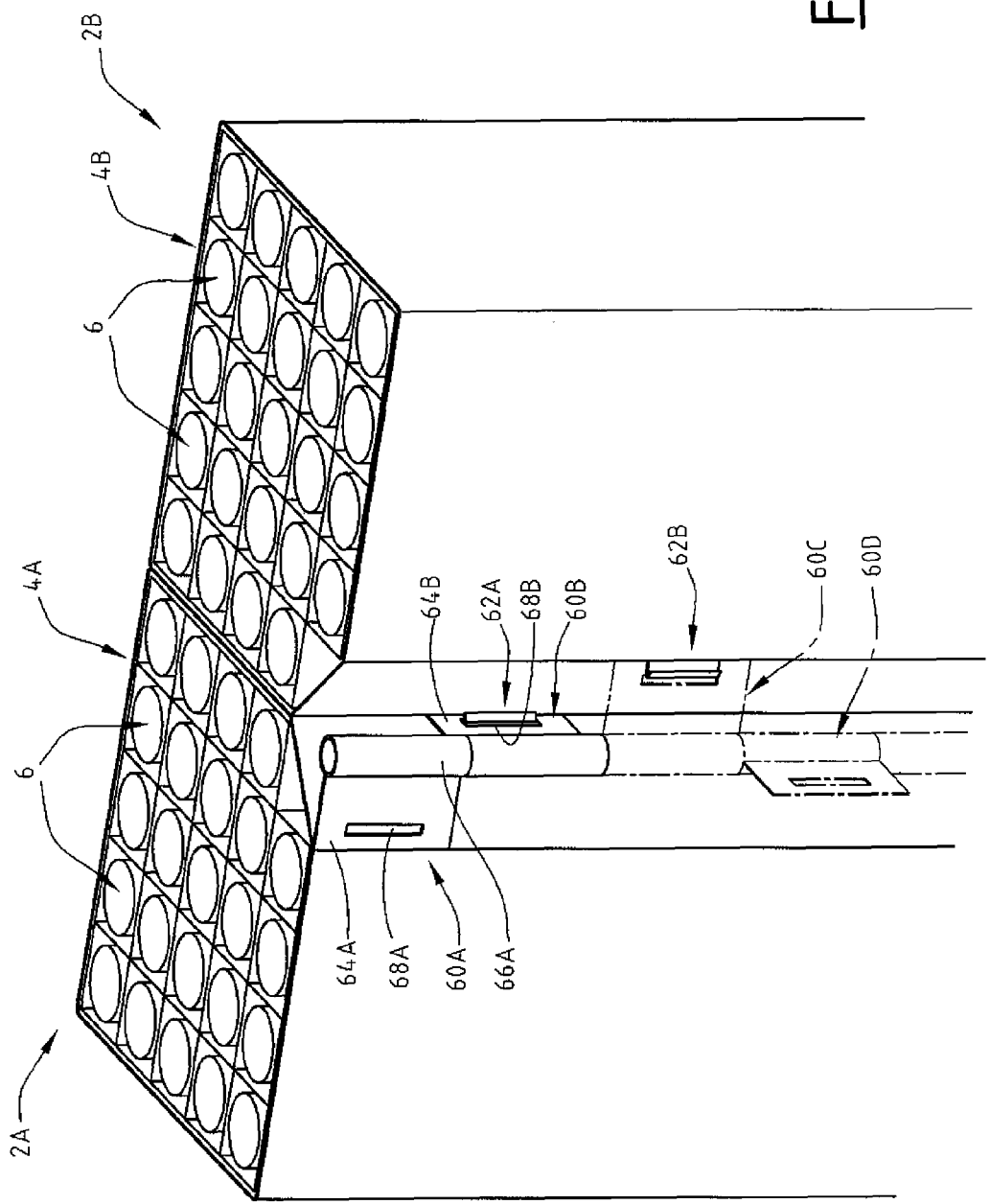

MODULE FOR FORMING A NUCLEAR FUEL ASSEMBLY AND CORRESPONDING NUCLEAR FUEL ASSEMBLY

This application claims priority to European Patent Application EP 09305921.0, filed on Sep. 30, 2009, the entire disclosure of which is incorporated by reference herein.

The present invention relates to nuclear fuel assemblies.

SUMMARY OF THE INVENTION

An object of the invention is to reduce costs related to development, manufacture and use of nuclear fuel assemblies.

To this end, the invention provides a module for forming a nuclear fuel assembly, of the type comprising a casing extending in a longitudinal direction, a bundle of fuel rods encased in and supported by the casing and connection means provided on the casing for connecting the casing side-by-side to the casing of at least one other module to obtain a nuclear fuel assembly having a channel box defined by the casings of the assembled modules and of larger cross-section than that of the casing of each of the assembled modules and a bundle of fuel rods of larger cross-section than that of each of the assembled modules.

In other embodiments, the module comprises one or several of the following features, taken in isolation or in any technically feasible combination:

the casing has a cross-section of polygonal shape with one bevelled corner for delimiting a space for a water channel between the casings of assembled modules;

the casing has a cross-section of regular polygonal shape with one bevelled corner, namely a cross-section of quadrilateral shape;

the bevelled corner is opened or is closed by a bevel wall of the casing;

the connection means are provided on longitudinal edges of the casing edging the bevelled corner;

the connection means comprise at least one sleeve aligned in the longitudinal direction with the missing edge of the polygonal cross-section of the casing;

the casing comprises at least one first side wall adapted to separate two sub-channels in a channel box defined by the casings of assembled modules;

each first side wall comprises at least one groove on the outer face of the first side wall;

each first side wall is adapted to define with first side walls of other modules assembled to the module a cross-shaped partition in a channel box defined by the casings of the assembled modules.

The invention also relates to a nuclear fuel assembly formed of a plurality of modules as defined above assembled together side-by-side.

In other embodiments, the nuclear fuel assembly comprises one or several of the following features, taken in isolation or in any technically feasible combination:

it comprises a water channel delimited by bevel walls of the casings of the modules each closing a bevelled corner of a respective casing exhibiting a polygonal cross-section with a bevelled corner;

it comprises a water channel delimited by a tube inserted in a spaced formed by bevelled corners of the casings of the modules exhibiting a polygonal cross-section with a bevelled corner;

it comprises a channel box defined by the casings of the assembled modules and a partition of cross-shaped cross-section dividing the channel box in sub-channels receiving a sub-bundle of fuel rods; and it comprises an outer tubular housing surrounding the casings of the modules.

BRIEF DESCRIPTION OF THE DRAWINGS

The invention and its advantages will be better understood on reading the following description, given solely by way of example, and with reference to the appended drawings, in which:

FIG. 15 is a perspective view of two of the four modules of the fuel assembly of FIG. 14.

DETAILED DESCRIPTION

Figure 1:
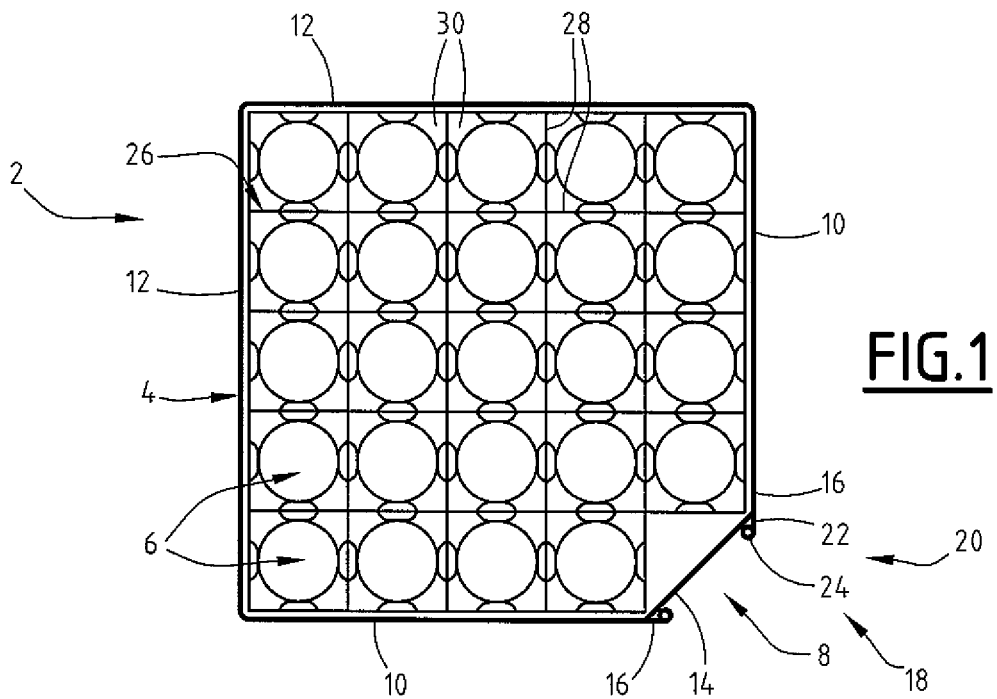
FIGS. 1 and 2 are respectively a top view and a partial perspective view of one module to be connected side-by-side to similar modules for forming a nuclear fuel assembly of larger cross-section according to the invention.
Figure 2:
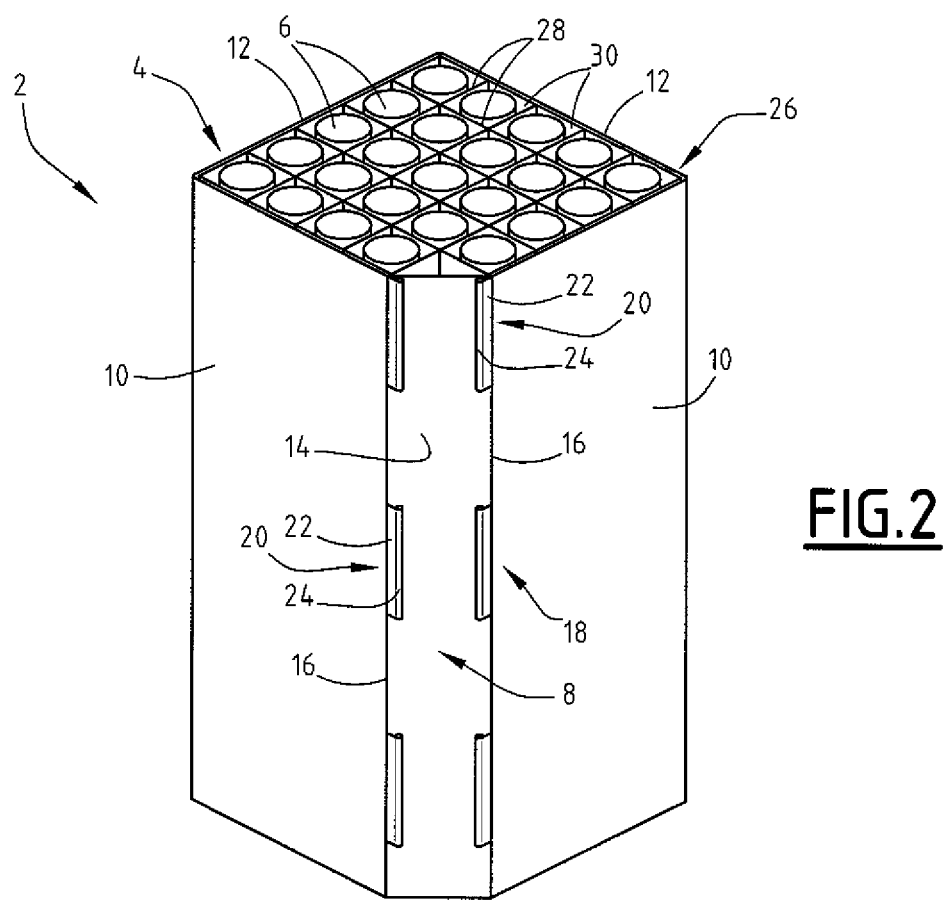

The module 2 for forming a nuclear fuel assembly illustrated on FIGS. 1 and 2 comprises a tubular casing 4 extending in a longitudinal direction and a bundle of fuel rods 6 accommodated inside the casing 4.

The module 2 is elongated in the longitudinal direction, only a longitudinal section of the module 2 being illustrated on FIG. 2 for the sake of clarity.

The casing 4 is adapted to allow a coolant to flow longitudinally from a longitudinal lower end towards a longitudinal upper end of the casing 4 around the fuel rods 6. The casing 4 is opened at its longitudinal ends.

The casing 4 exhibits a closed transverse cross-section of square shape with one bevelled corner 8.

The casing 4 comprises four side walls 10, 12 arranged in a square. The side walls 10, 12 comprise two first side walls 10 adjacent the bevelled corner 8 and two second side walls 12 opposite the bevelled corner 8. Each first side wall 10 extends from the adjacent second side wall 12 towards the bevelled corner 8 and is of smaller width than the opposed second side wall 12. The bevelled corner 8 is edged by one longitudinal edge 16 of each first side wall 10.

The casing 4 comprises a bevel wall 14 closing the bevelled corner 8. The bevel wall 14 connects the longitudinal edges 16 of the first side walls 10. The bevel wall 14 extends at an angle of 45° relative to each first side wall 10 edging the bevelled corner 8. In alternative, the angles between the bevel wall 14 and each one of the first side wall 10 are different.

The module 2 comprises connection means 18 for connecting the casing 4 to the casing of another module identical or similar to module 2 and provided with corresponding connection means.

The connection means 18 comprise connection members 20 provided on the longitudinal edges 16 of the first side walls 10 edging the bevelled corner 8.

Each connection member 20 comprises a tab 22 projecting in cantilever from one of the longitudinal edges 16 and an anchoring rib 24 disposed at the free end of the tab 22. The tab 22 extends from the longitudinal edge 16 in the plane of the corresponding first side wall 10, towards the fictive missing edge of the square section of the casing 4. The tab 22 ends at a distance from the fictive missing edge. The rib 24 of each connection member 20 is elongated longitudinally and protrudes from the tab 22 towards the interior of the casing 4.

The connection means 18 comprise a plurality of connection members 20 distributed along each one of the longitudinal edges 16 edging the bevelled corner 8. Each one of the connection members 20 provided on one longitudinal edge 16 is arranged at the same longitudinal position than one connection member 20 provided on the other longitudinal edge 16. In alternative, the connection means 18 comprise one single connection member 20 on each longitudinal edge 16.

The fuel rods 6 of the module 2 are encased in the casing 4. The length of the casing 4 is substantially equal or superior to the length of the fuel rods 6.

Each fuel rod 6 comprises in a know manner an elongated tubular cladding, nuclear fuel pellets stacked in the cladding and a pair of plugs closing the ends of the cladding.

The fuel rods 6 extend parallel to each other in the longitudinal direction inside the casing 4 and are supported by the casing 4.

The fuel rods 6 are arranged in a lattice and maintained transversely in spaced relationship inside the casing 4. The lattice is a 5×5 lattice of regular pitch with one fuel rod omitted in one corner due to the bevelled corner 8 of the casing 4. In alternative, the lattice may have a different amount of fuel rods 6, exhibit a varying pitch and/or have more than one fuel rod omitted depending on the size of the bevelled corner 8.

In a known manner, some fuel rods 6 may be replaced in the lattice by part length fuel rods or water rods or by guide tubes.

The module 2 comprises spacer grids 26 (FIG. 1) for supporting the fuel rods 6 longitudinally and transversely inside the casing 4.

In the illustrated embodiment, each spacer grid 26 comprises intersecting strips 28 defining a plurality of cells 30 arranged in a lattice, each cell 30 being intended to receive one respective fuel rod 6.

In a know manner, each cell 30 of the spacer grid 26 is provided with means for supporting one fuel rod 6 extending through the cell 30, such as springs and/or dimples formed in the strips 28 and/or assembled to the strips 28.

Each spacer grid 26 is connected for instance to the side walls 10, 12 and optionally the bevel wall 14 of the casing 4 in a known manner, e.g. by complementary fittings and/or welding. Several spacer grids 26 are distributed along the length of the fuel rods 6.

The module 2 is able to be handled as a single individual unit.

Figure 3:
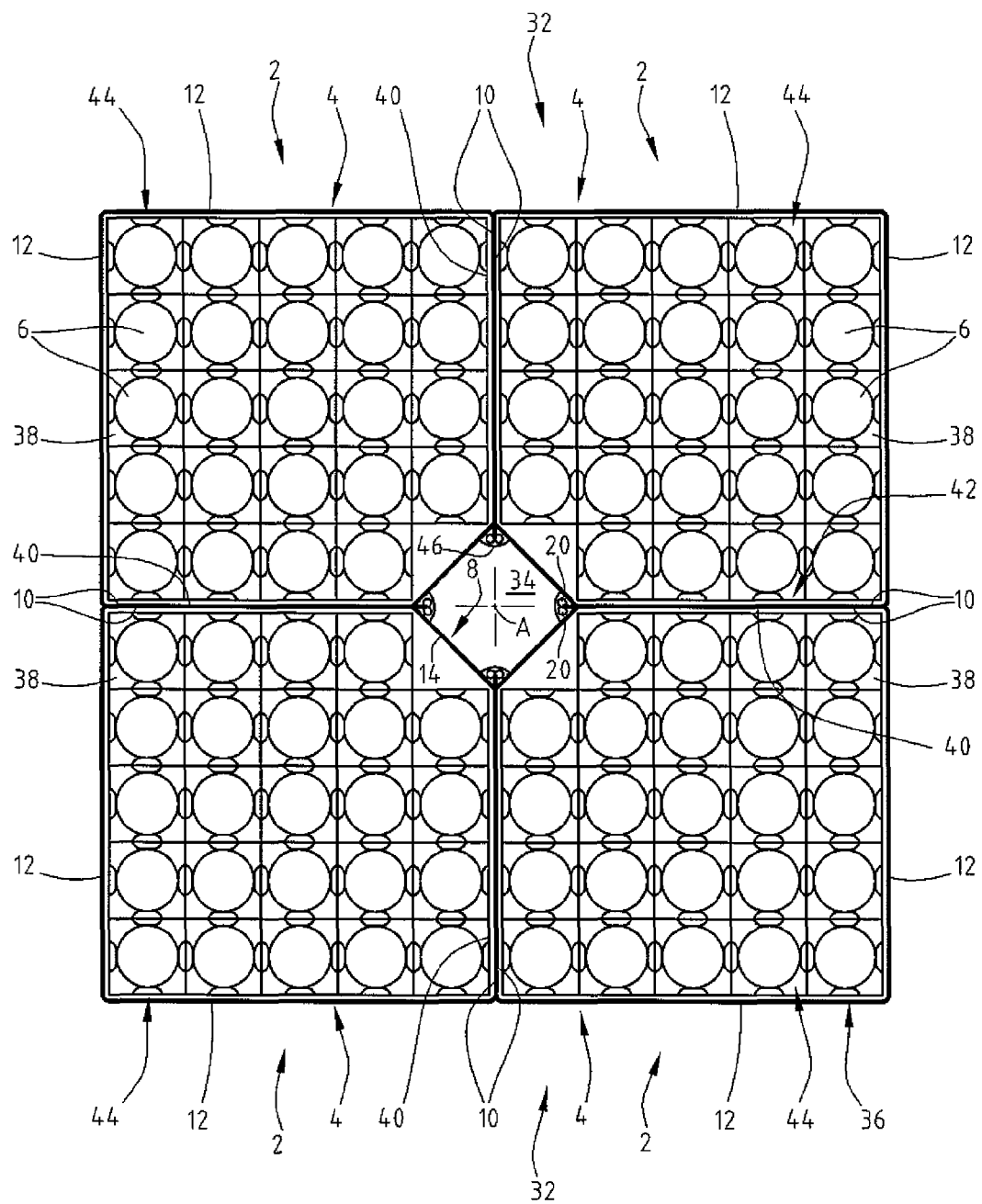
FIG. 3 is a top view of a nuclear fuel assembly formed by connection of four modules as illustrated on FIGS. 1 and 2.

The nuclear fuel assembly 32 illustrated on FIG. 3 is formed of four identical modules 2 as illustrated on FIGS. 1 and 2 disposed parallel and side-by-side in a 2×2 pattern and mutually connected.

Each module 2 defines a portion of the cross-section of the fuel assembly 32.

The modules 2 are oriented such that their bevelled corners 8 are adjacent thus defining a water channel 34 extending along a longitudinal axis A of the fuel assembly 32. The bevel walls 14 of the modules 2 define side walls of the water channel 34 which is thus closed laterally.

The casing 4 of each module 2 is in contact by one of his first side walls 10 with the one of the first side walls 10 of the casing 4 of another module 2.

The casings 4 of the modules 2 define together a channel box 36 of the fuel assembly 32 for conducting coolant flow along the fuel rods 6 in the longitudinal direction.

The channel box 36 exhibits an outer square-shaped cross-section defined by the second side walls 12 of the casings 4.

The channel box 36 is of larger cross-section that the casing 4 of each of the assembled modules 2.

The channel box 36 is divided in four sub-channels 38 separated by a cross-shaped partition 40 defined by the first side walls 10 of the casing 4 and the bevel walls 14 of the casings 4. Each pair of first side walls 10 in contact defines one branch 42 of the partition 40. Each branch 42 extends from the water channel 34 to the channel box 36.

The fuel rods 6 of each module 2 define a sub-bundle 44 of fuel rods 6 of the fuel assembly 32. Each sub-bundle 44 extends in a respective sub-channel 38. The fuel assembly 32 thus has a bundle of fuel rods 6 of larger cross-section than that of each of the assembled modules 2.

The casing 4 of each pair of adjacent modules 2 are connected using their connection members 20.

For each pair of adjacent first side walls 10, the connection members 20 of the two first side walls 10 are adjacent and located at the same longitudinal position. The connection members 20 of each pair are connected by positioning a connection piece 46 around the ribs 24 of the connection members 20 to prevent spacing between the connection members 20.

The connection piece 46 is fixed to the connection members 20, e.g. by welding and/or crimping the connection piece 46 around the ribs 24.

Figure 4:
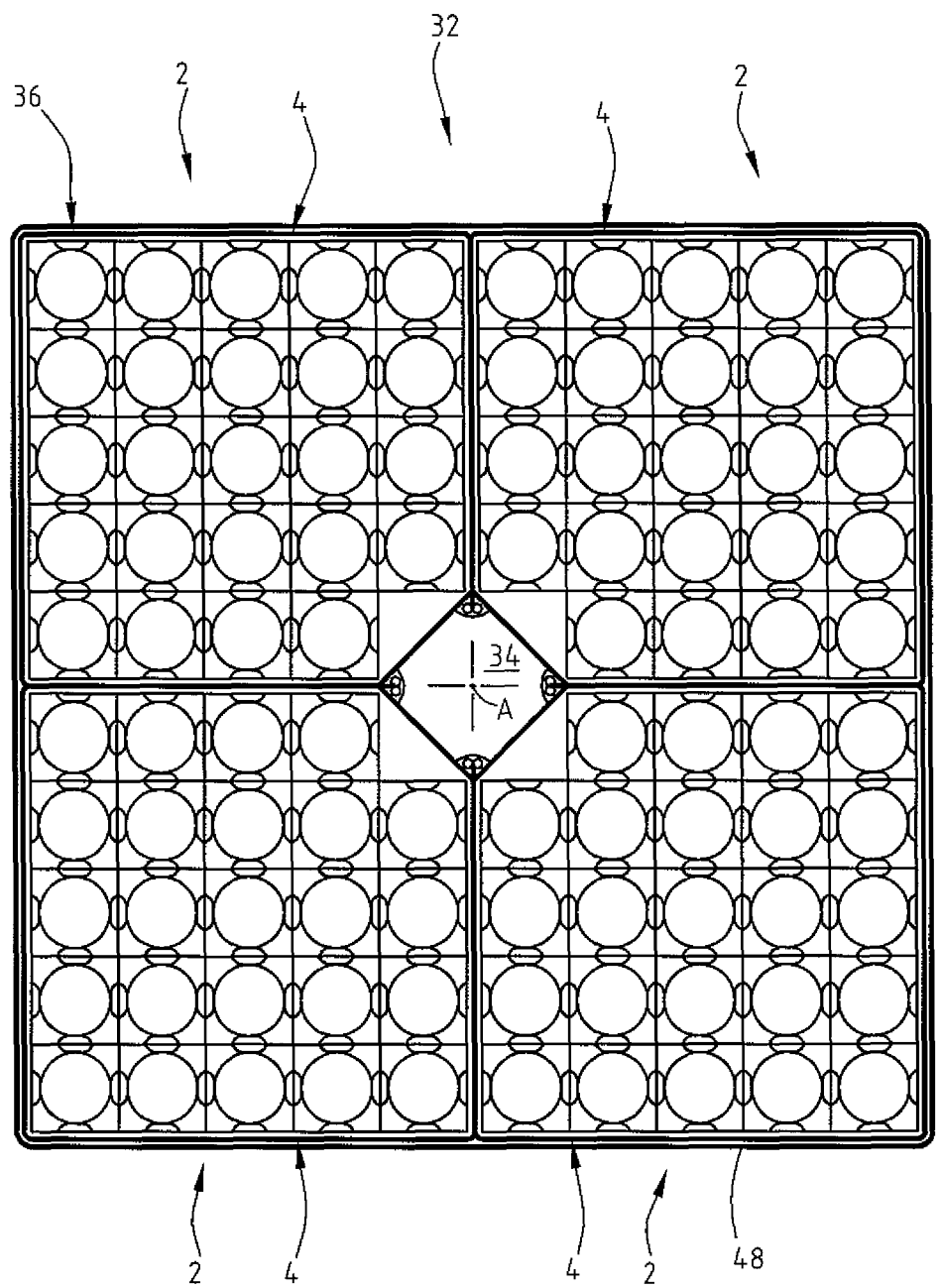
FIG. 4 is a top view of a nuclear fuel assembly formed by connection of four modules as illustrated on FIGS. 1 and 2 according to a variant.

The fuel assembly 32 as illustrated on FIG. 4 differs from that of FIG. 3 in that it further comprises a tubular housing 48 surrounding the modules 2 for stiffening the fuel assembly 32.

The housing 48 is tubular and has a closed square-shaped cross-section corresponding to the outer cross-square of the channel box 36 section defined by the second side walls 12 of the assembled modules 2.

The modules 2 are connected to the housing 48 in a known manner, e.g. by form fittings and/or welding.

Figure 5:
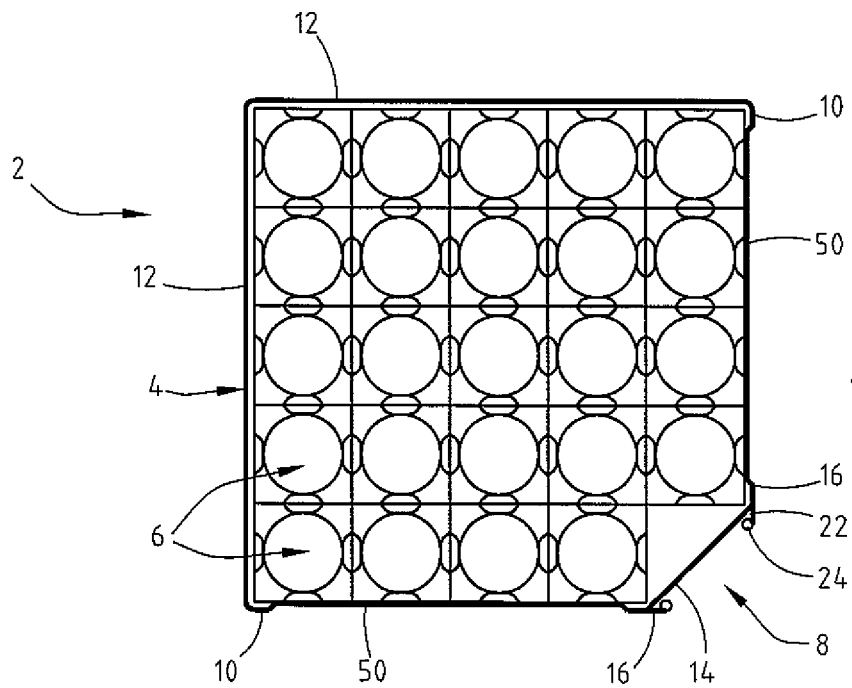
FIGS. 5 and 6 are views analogous to that of FIGS. 1 and 2 of a module according to another embodiment.
Figure 6:
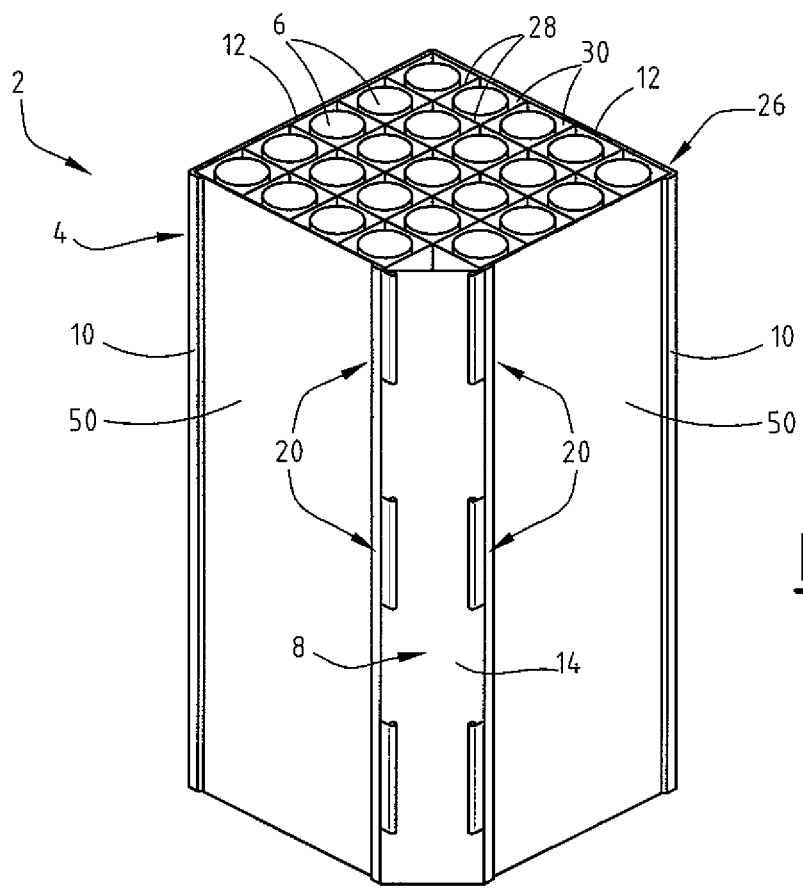

Upon assembly, the modules 2 are assembled together, and then introduced into the housing 48 by sliding in the longitudinal direction The module 2 illustrated on FIGS. 5 and 6 differs from that of FIGS. 1 and 2 in that each first side wall 10 is formed with a groove 50 on the outer surface of the first side wall 10, said groove 50 extending in the longitudinal direction from the lower end to the upper end of the first side wall 10. The groove 50 is of general U-shape cross section with a large width and a relative small depth.

Figure 7:
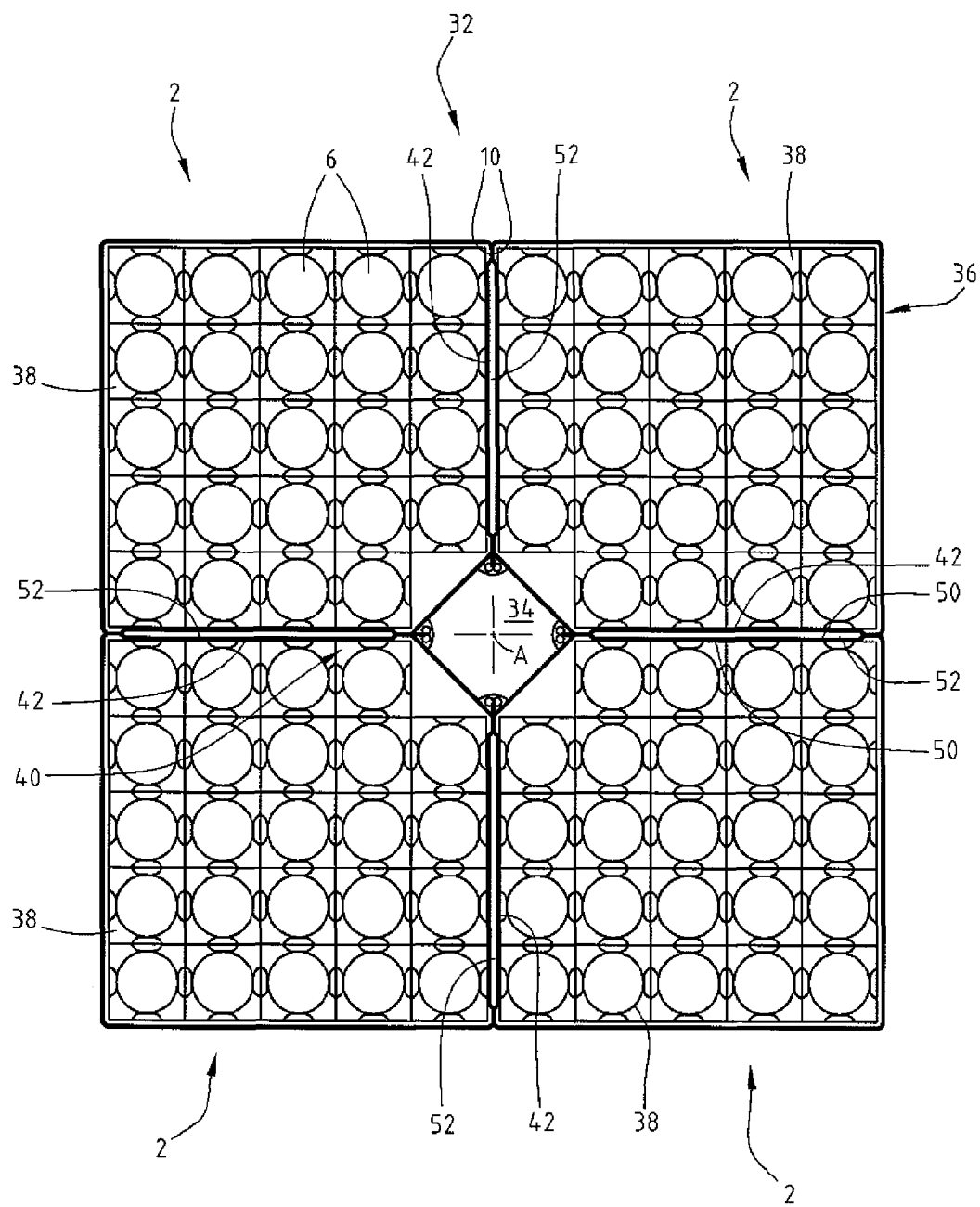
FIG. 7 is a top view of a nuclear fuel assembly formed by connection of four modules as illustrated on FIGS. 5 and 6.

The fuel assembly 32 illustrated on FIG. 7 results from the connection of four modules 2 as illustrated on FIGS. 5 and 6.

The grooves 50 provided on each pair of first side walls 10 in contact define between said pair of first side walls 10 an internal water duct 52 extending longitudinally.

Consequently, each branch 42 of the cross-shaped partition 40 is provided with one internal water duct 52, thus increasing the amount of coolant flowing separately from the sub-channels 38 and the fuel rods 6.

Figure 8:
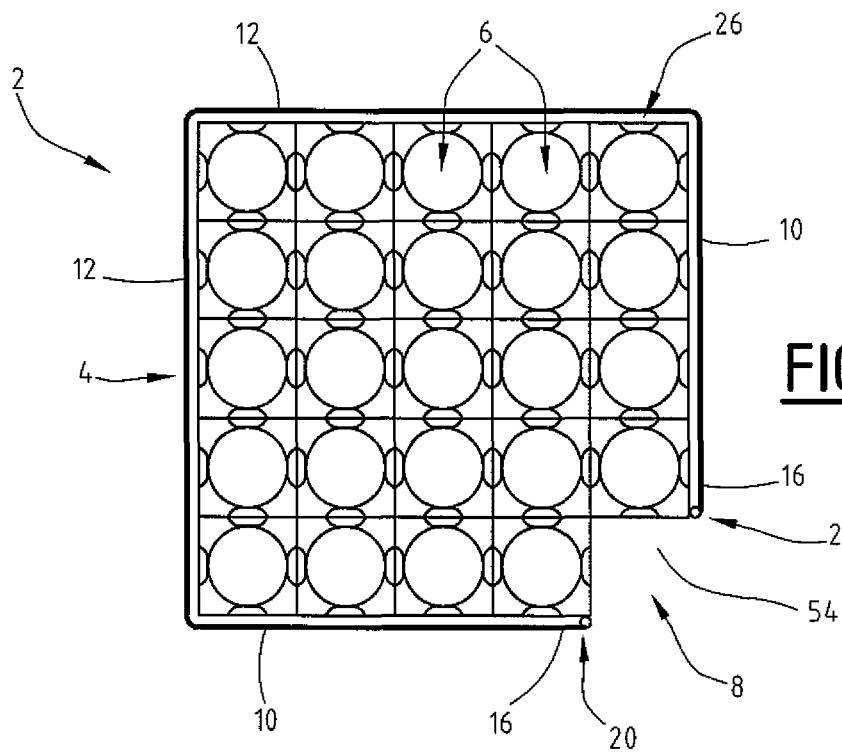
FIGS. 8 and 9 are views analogous to that of FIGS. 1 and 2 of a module according to another embodiment.
Figure 9:
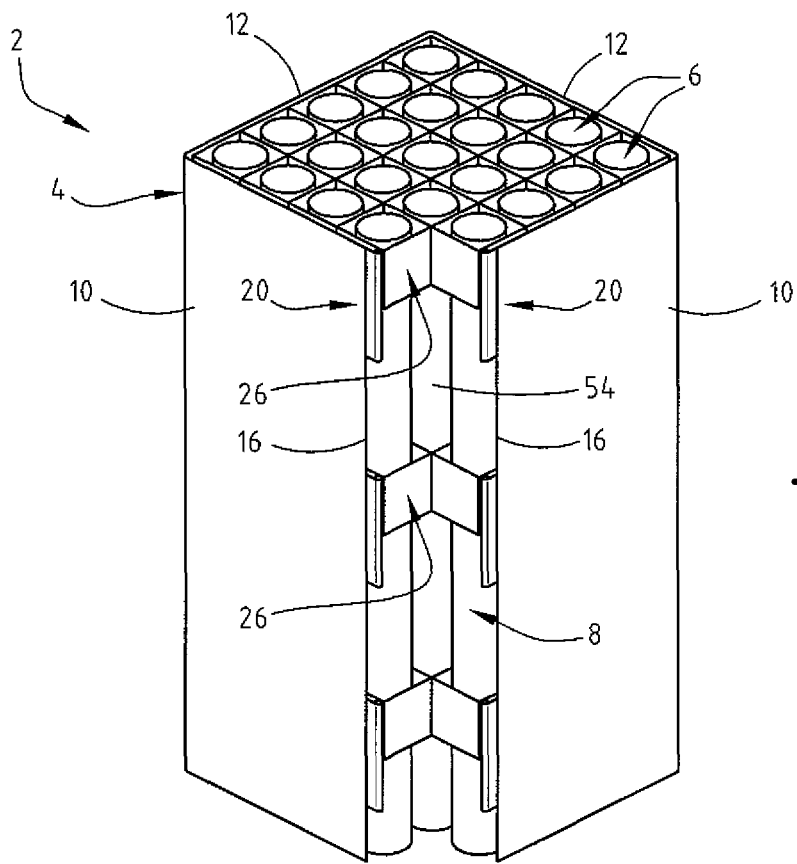

The module 2 of FIGS. 8 and 9 differs from that of FIGS. 1 and 2 in that the casing 4 is deprived of bevel wall for closing the bevelled corner 8. The casing 4 thus has a longitudinal opening 54 delimited between the longitudinal edges 16 edging the bevelled corner 8.

Figure 10:
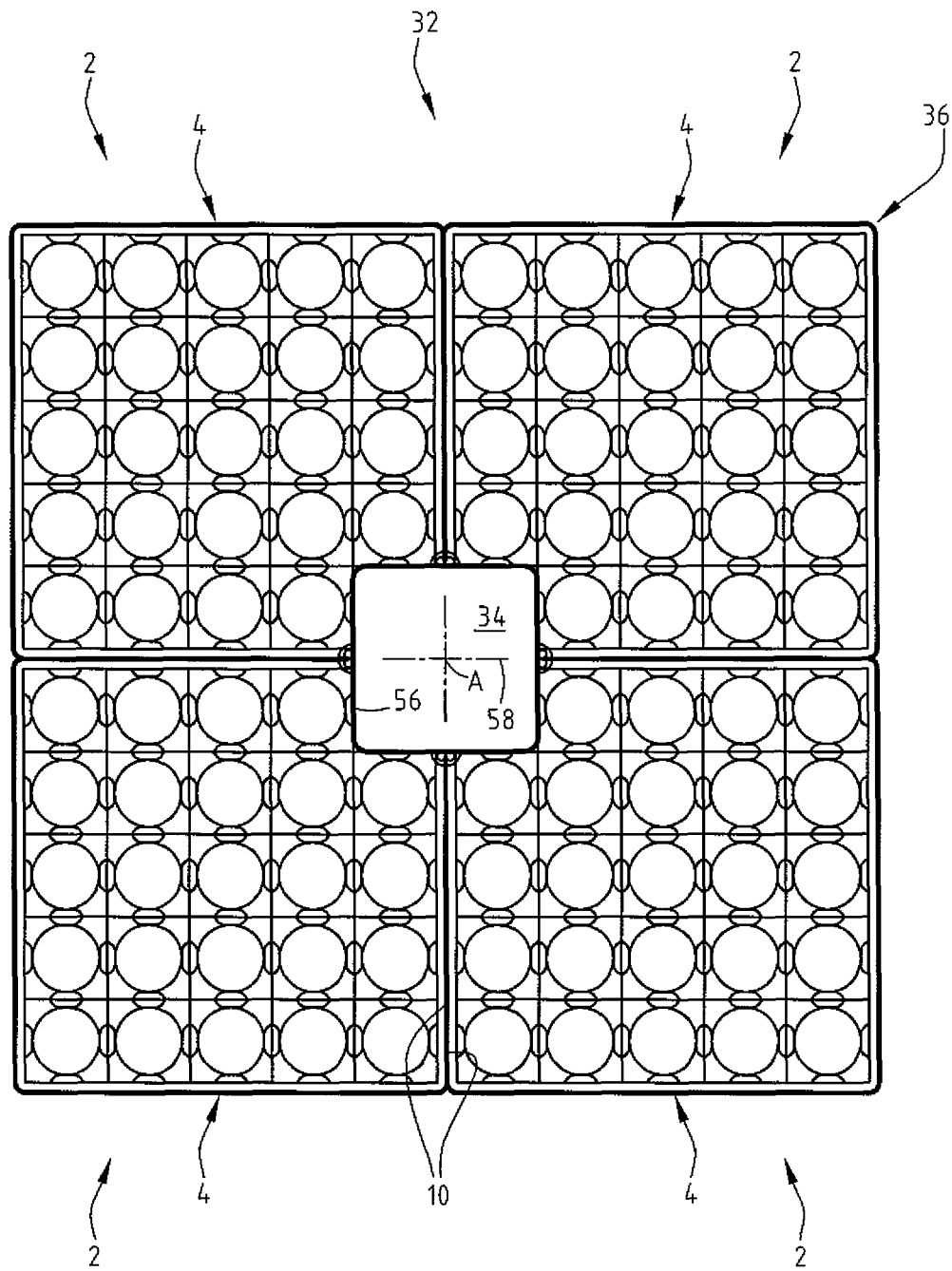
FIG. 10 is a top view of a nuclear fuel assembly formed by connection of four modules as illustrated on FIGS. 8 and 9 to a tube.

The fuel assembly 32 illustrated on FIG. 10 results from the connection of four open modules 2 as illustrated on FIGS. 8 and 9.

The fuel assembly 32 comprises a tube 56 inserted in the free space defined by the bevelled corners 8 of the assembled modules 2 to define the water channel 34.

As illustrated, the tube 56 extends longitudinally and has a square-shaped cross-section. The tube 56 is oriented to have its walls parallel to that of the channel box 36. The tube 56 can be provided with a larger area in cross-section than a water channel 34 formed by inclined bevel walls closing the bevelled corner 8.

The tube 56 is optionally provided with a profiled reinforcing member 58 inserted inside the tube 56. The reinforcing member 58 is elongated in the longitudinal direction and has cross shaped cross-section with four branches extending from the centre of the tube 56 to the walls thereof.

The tube 56 is connected to the first side walls 10 of the modules 2 in a known manner, e.g. by form fittings and/or welding.

Figure 11:
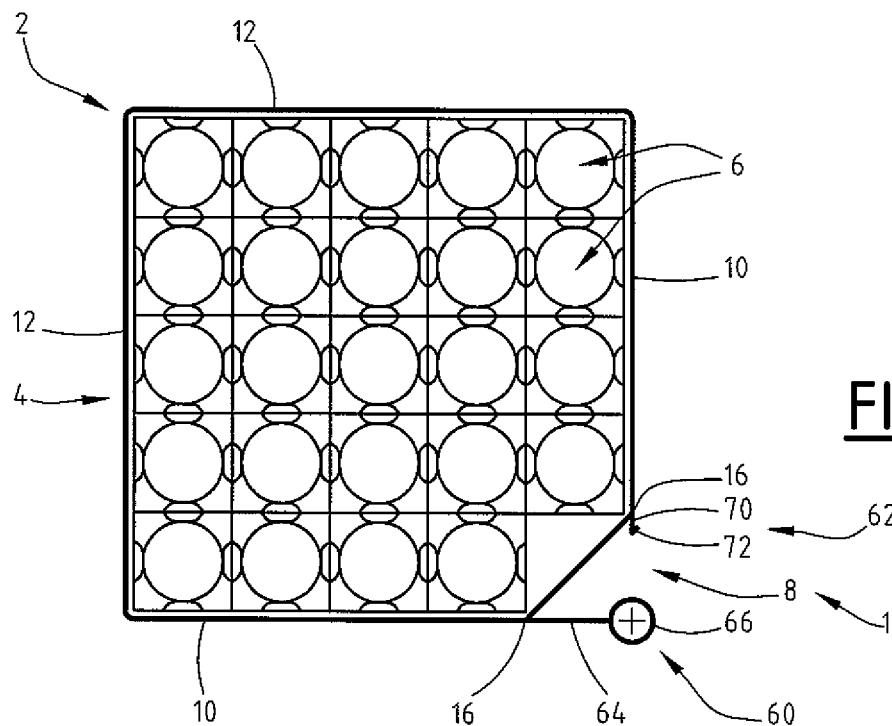
FIGS. 11 and 12 are views analogous to that of FIGS. 1 and 2 of a module according to another embodiment.
Figure 12:
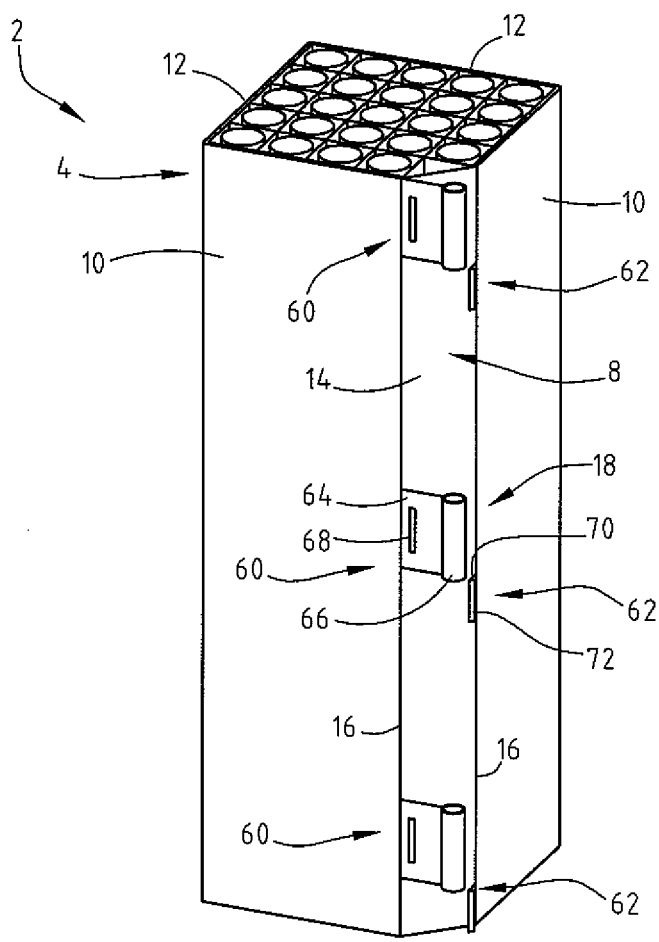

The module 2 of FIGS. 11 and 12 differs from that of FIGS. 1 and 2 by the connection means 18.

The connection means 18 comprise first connection members 60 distributed along one of the longitudinal edges 16 edging the bevelled corner 8, and second connection members 62 distributed along the other one of longitudinal edges 16 edging the bevelled corner 8.

Each first connection member 60 comprises a tab 64 projecting from the corresponding longitudinal edge 16 towards the fictive missing edge of the square section of the casing 4, and a sleeve 66 provided at the free edge of the tab 64 and adapted to be fitted onto a support rod as it will be detailed below.

The sleeve 66 is tubular and extends in a longitudinal axis corresponding to the fictive missing edge of the square section of the casing 4.

The tab 64 comprises an opening 68. The opening 68 is of rectangular outline elongated in the longitudinal direction.

Each second connection member 62 is hook-shaped and adapted to be hooked in the opening 68 of a first connection member 60 of connection means 18 of another module 2 upon assembling the modules 2.

Each second connection member 62 comprises a leg 70 extending from the corresponding longitudinal edge 16 towards the fictive missing edge of the square section of the casing 4 substantially in the plane of the adjacent first side wall 10 and a prong 72 extending from the leg 70 at an obtuse angle relative to the leg 70, towards the outside of the casing 4. Each second connection member 62 ends at a distance from the fictive missing edge of the square section of the casing 4.

Figure 13:
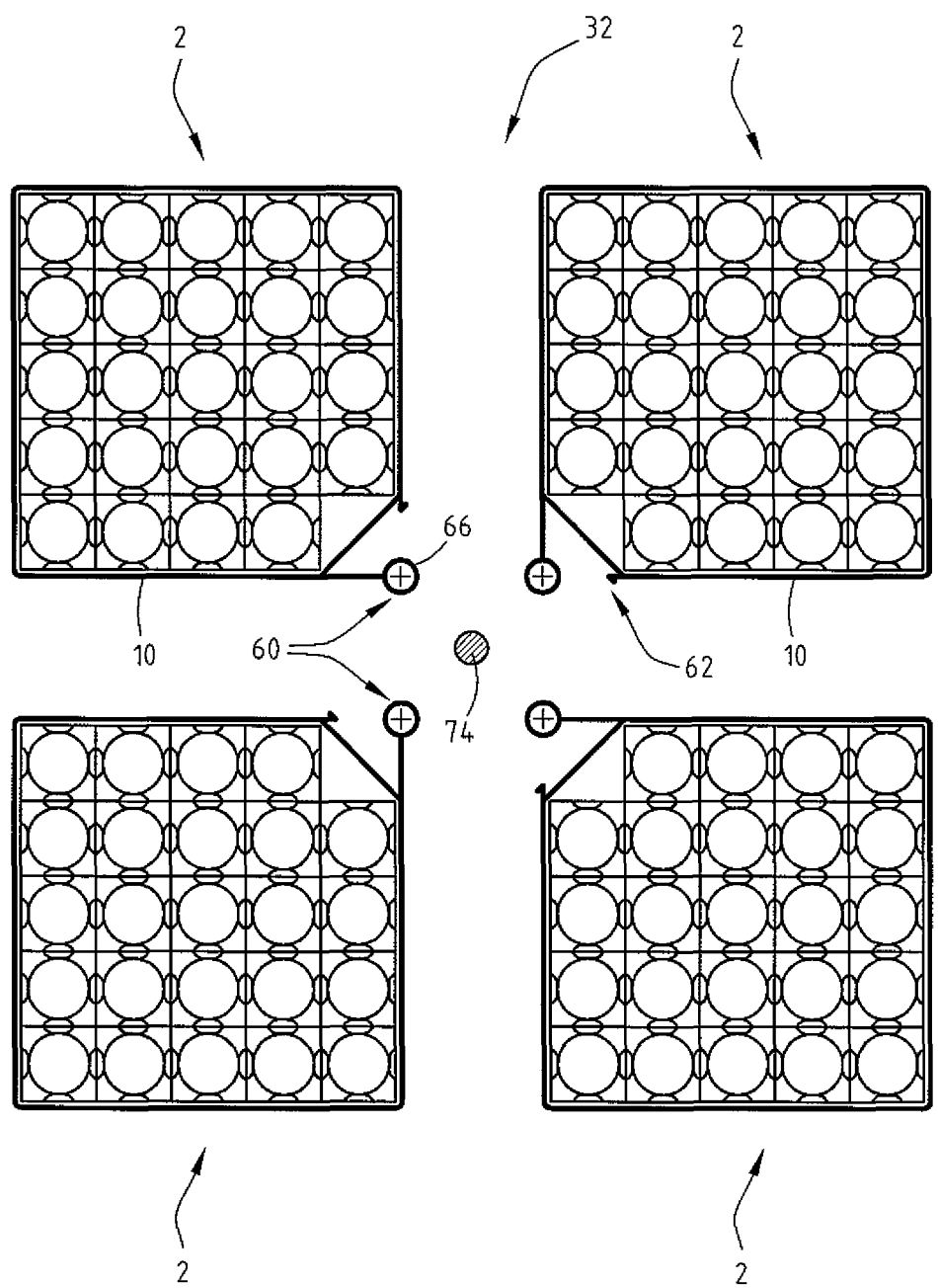
FIGS. 13 and 14 are top views of a nuclear fuel assembly formed by connection of four modules as illustrated on FIGS. 11 and 12, respectively before and after connection of the modules.
Figure 14:
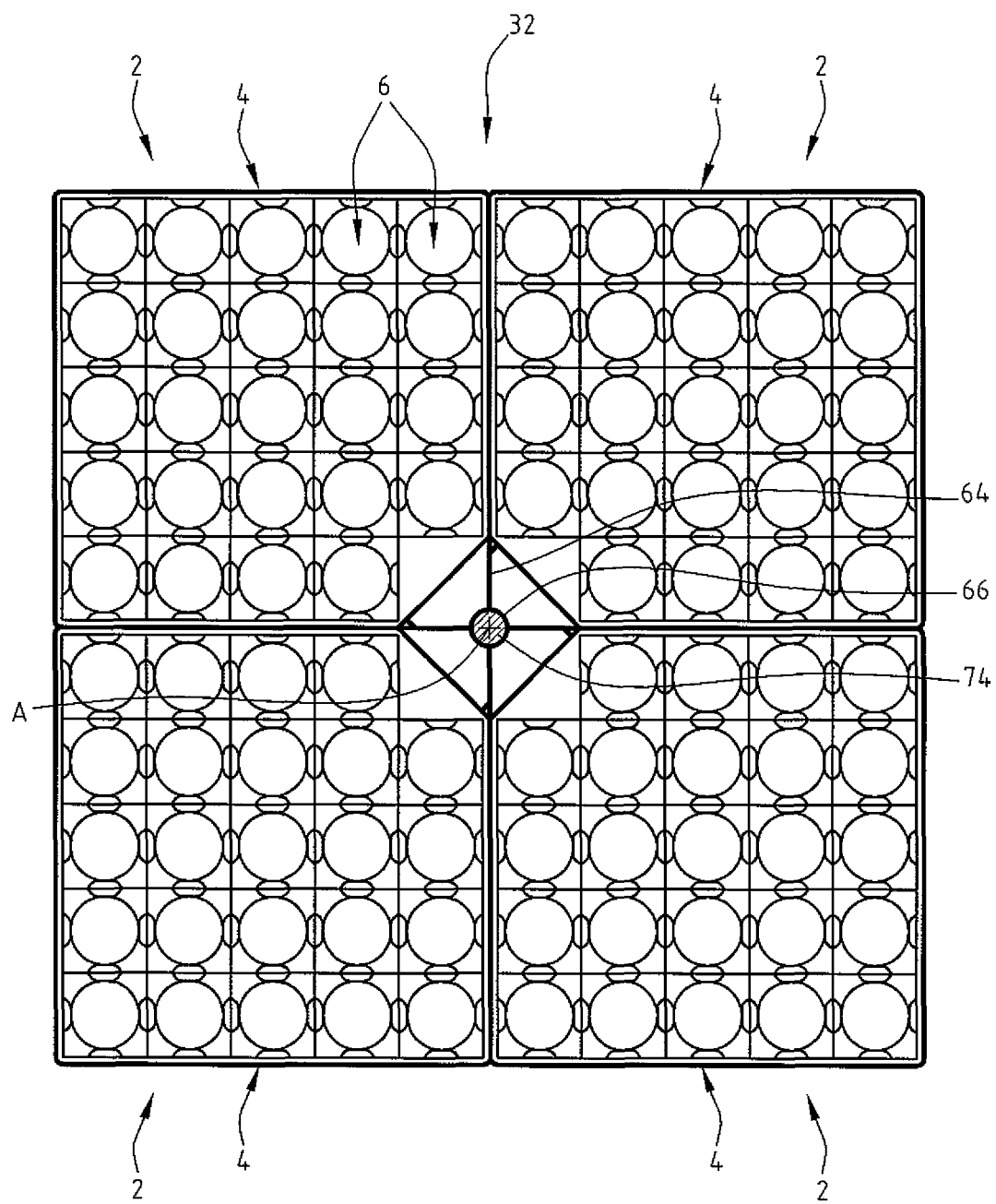

As illustrated on FIGS. 13 and 14, four modules 2 similar to that of FIGS. 11 and 12 are assembled to form a nuclear fuel assembly 32 having a bundle of fuel rods 6 of larger cross-section than each of the modules 2 forming the fuel assembly 32.

Upon assembling the modules 2, each second connection member 62 of each module 2 engages into the opening 68 of a first connection member 60 of an adjacent module 2.

Then, as illustrated on FIG. 14, the four modules 2 are arranged side-by-side in the longitudinal direction such that the sleeves 66 of their first connection members 60 are aligned in a longitudinal axis A and a support rod 74 is inserted through the sleeves 66 of the different modules 2.

The sleeves 66 are fixed to the support rod 74, e.g. by form fittings and/or by welding.

Consequently, each module 2 is connected to a common support rod 74 and to the adjacent modules 2. The connection between the modules 2 is stiff and the fuel assembly 32 is stiff.

The modules 2 differs by the position of their first and second connection members 60, 62 to allow alignment of the sleeves 66 of the different modules 2 in a longitudinal axis and engagement of the second connection members 62 into the corresponding first connection members 60.

As illustrated on FIG. 12, the first connection members 60 of each module 2 are spaced longitudinally with a pitch at least four times the longitudinal height of the sleeves 66. The second connection members 62 are spaced with the same pitch with being offset longitudinally relative to the first connection members 60 by a quarter of said pitch.

Further, the connection members 60, 62 of each of the plurality of modules 2 to be assembled to form one fuel assembly 32 are offset longitudinally relative to the connection members 60, 62 of the other modules 2 such that the connection members 60, 62 of the different modules 2 insert between each other.

Hence, a module 2 to be arranged beside the module 2 of FIG. 12 on the side of the first side wall 10 provided with the first connection members 60 is provided with second connection members 62 at the same longitudinal position than the first connection members 60 of module 2 of FIG. 12, and another module 2 to be arranged beside the module 2 of FIG. 12 on the side of the first side wall 10 provided with the second connection members 62 is provided with first connection members 60 at the same longitudinal position than the second connection members 62 of module 2 of FIG. 12.

FIG. 15 illustrates the insertion and cooperation of the first and second connection members 60, 62 of the four modules 2 assembled to form the fuel assembly 32 of FIG. 14. The modules 2 and their components are differentiated by suffix letters A, B, C and D added to the numeral references.

In alternative, the distribution of the first and second connection members 60, 62 may be different. For example, each longitudinal edge 16 edging the bevelled corner 8 of the casing 4 of each module 2 may be provided with both first and second connection members 60, 62 and/or the distribution of the connection members 60, 62 in the longitudinal direction may be regular or irregular.

The sleeves 66 of the module(s) 2 of FIGS. 11-15 have a closed cross-section. In alternative, connection means 18 have sleeves 66 of open cross-section with a lateral aperture, namely hemi-cylindrical sleeves 66, to allow laterally inserting the support rod 74 into the sleeves 66 to ease assembly of several modules 2.

Fuel assemblies have to undergo tests before they can be fabricated, delivered and used industrially in nuclear power plant. Providing a fuel assembly of modular conception formed of several modules having a general structure which is substantially identical, allows reducing tests to only one module or testing several different solutions, for instance one per module, thus reducing development and test costs for the fuel assembly.

The features involved in the performance of the fuel assembly are namely the cross-section of the casing of each module and the lattice arrangement of the fuel rods of each module. Spacer grids may also influence performance, as well as optional mixing grids, which are similar to spacer grids but do not provide support for the fuel rods.

In the different embodiments, each module can be handled as a unit thus making transport and/or handling easier.

The modular conception also allows reducing maintenance or operation costs. For example, in case of failure of one fuel rod in a fuel assembly, the modular conception makes it easier to replace this fuel rod by replacing the module comprising the incriminated fuel rod.

The modular conception further allows reducing costs of fuel cycle: one fuel assembly having burnt and partly burnt fuel rods can be reused after replacing one single module, namely the module including the burnt fuel rods.

In the illustrated embodiments, the modules have casings of generally square shaped cross-section with one bevelled corner for delimiting a coolant channel in the centre of the fuel assembly. It is also possible to provide modules of generally rectangular shape with one bevelled corner, for example 4×5 or 5×6 modules. In a general manner, the modules have casings of generally quadrilateral shape.

More generally, the modules have a casing exhibiting a cross-section having the shape of an angular sector of a polygon, preferably a regular polygon. The casings of such assembled modules define a channel box having the polygonal cross-section.

For example, the casings exhibit cross-section of isosceles triangles with one bevelled corner, to obtain a hexagonal channel box.

Modules can be provided in different sizes in cross-section whilst having complementary connection means. Modules having identical or different sizes can be assembled to form fuel assemblies of various sizes.

For example a 8×8 fuel assembly may be obtained by assembling four 4×4 modules, a 10×10 fuel assembly may be obtained by assembling four 5×5 modules or by assembling one 6×6 module with two 6×4 modules and one 4×4 module or by assembling two 6×5 modules with two 4×5 modules. Similarly a 9×9 fuel assembly may be obtained by assembling one 5×5 module with two 4×5 modules and one 4×4 module or by assembling nine 3×3 modules allowing delimitation of one, two, three and even four water channels depending on the presence or not of one bevelled corner on each module. The examples above are given for the sole purpose of illustration and any fuel assembly lattices can be obtained be combination of adequate modules.

Forming a fuel assembly by assembling modules of different sizes allow providing a water channel offset with respect to the central axis of the fuel assembly.

Hence, a limited number of modules allows obtaining fuel assemblies of different sizes in cross-section, with various positions for a water channel.

In a general manner, fuel assemblies are obtained by assembling modules of the same type having corresponding connection means allowing assembling the modules side-by-side to form a fuel assembly of larger cross-section than each module. The modules of the same type are identical or similar and differing e.g. by their general shape and/or size in cross-section and/or their connections means.

The invention is particularly suitable for fuel assemblies for Boiling Water Reactors (BWR) since the casings of the assembled modules define a channel box for conducting coolant flow, and is also suitable for Pressurized Water Reactors (PWR).

What is claimed is:

1. A module for forming a nuclear fuel assembly comprising:

a casing extending in a longitudinal direction, a bundle of fuel rods encased in and supported by the casing and a connector provided on the casing for removably connecting the casing side-by-side to an other casing of at least one other module to obtain, when assembled, a nuclear fuel assembly having a channel box defined by the casing of the assembled module and the other casing of the at least one other module, the channel box being of a larger cross-section than that of the casing of each of the assembled modules and the other modules and a bundle of fuel rods of larger cross-section than that of each of the assembled modules and other modules, each module being movable as a single individual unit independent of the other modules.

2. The module according to claim 1 wherein the casing has a cross-section of polygonal shape with one bevelled corner for delimiting a space for a water channel between the casings of assembled modules.

3. The module according to claim 1 wherein the casing has a cross-section of a regular polygonal shape with the exception of one bevelled corner.

4. The module according to claim 2 wherein the bevelled corner is opened or is closed by a bevel wall of the casing.

5. The module according to claim 2 wherein the connector is provided on longitudinal edges of the casing edging the bevelled corner.

6. The module according to claim 2 wherein the connector comprises at least one sleeve aligned in the longitudinal direction with a missing edge of the polygonal cross-section of the casing.

7. The module according to claim 1 wherein the casing comprises at least one first side wall adapted to separate two sub-channels in the channel box defined by the casings of assembled modules.

8. The module according to claim 7 wherein each first side wall comprises at least one groove on an outer face of the first side wall.

9. The module according to claim 7 wherein each first side wall is adapted to define with first side walls of other modules assembled to the module a cross-shaped partition in the channel box defined by the casings of the assembled modules.

10. A nuclear fuel assembly comprising the module according to claim 1 assembled together side-by-side with the at least one other module.

11. The nuclear fuel assembly according to claim 10 comprising a water channel delimited by bevel walls of casings of the modules each closing a bevelled corner of a respective casing exhibiting a polygonal cross-section with the bevelled corner.

12. The nuclear fuel assembly according to claim 11 comprising the water channel delimited by a tube inserted in a spaced formed by the bevelled corners of the casings of the modules exhibiting a polygonal cross-section with the bevelled corner.

13. The nuclear fuel assembly according to claim 10 comprising a channel box defined by the casings of the assembled modules and a partition of cross-shaped cross-section dividing the channel box in sub-channels receiving a sub-bundle of fuel rods.

14. The nuclear fuel assembly according to claim 10 comprising an outer tubular housing having a section corresponding to that of the channel box defined by the modules assembled side-by-side.

15. The module as recited in claim 3 wherein the casing has a cross-section of the beveled corner and four other sides.

* * * * *